Dec. 22, 1925.  
L. ALEXANDER ET AL  
1,566,300  
PROTECTIVE SHIELD  
Filed Oct. 9, 1924
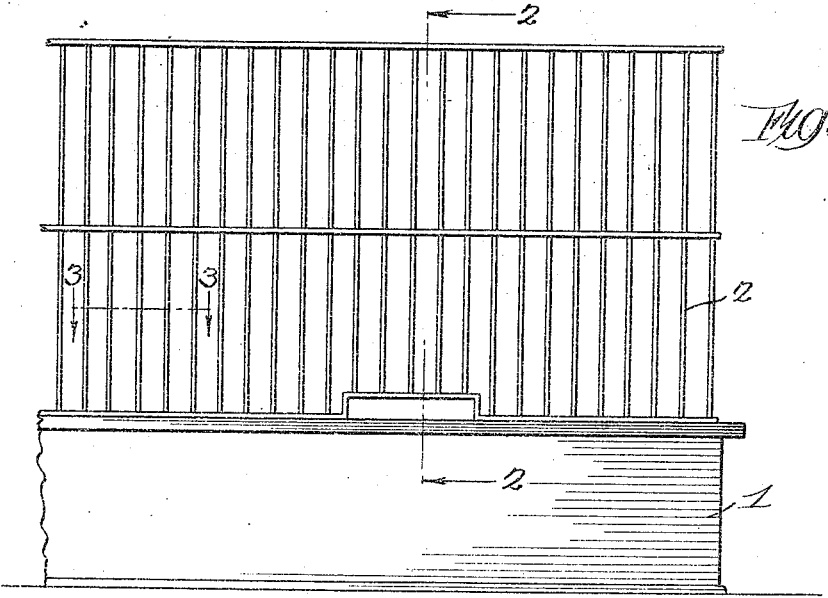
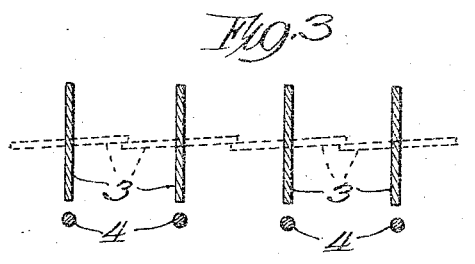
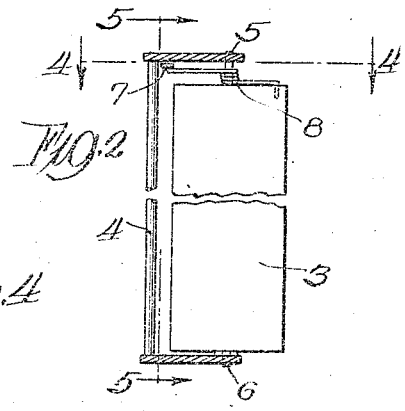
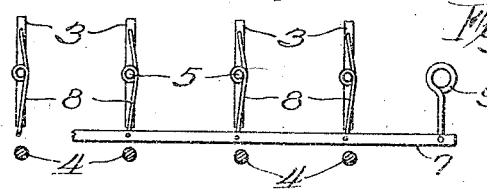
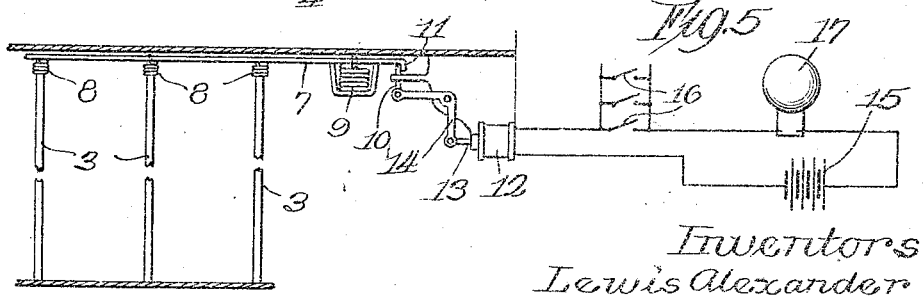
Inventors:  
Lewis Alexander  
William H. H. Hastings  
By Arthur A. Durand, Atty.

Patented Dec. 22, 1925.

1,566,300

UNITED STATES PATENT OFFICE.

LEWIS ALEXANDER AND WILLIAM H. H. HASTINGS, OF CLINTON, ILLINOIS.

PROTECTIVE SHIELD.

Application filed October 9, 1924. Serial No. 742,627.

*To all whom it may concern:*

Be it known that we, LEWIS ALEXANDER and WILLIAM H. H. HASTINGS, citizens of the United States, and residents of Clinton, De Witt County, Illinois, have invented a certain new and useful Improvement in Protective Shields, of which the following is a specification.

This invention relates to protective devices for banks and other offices or places, and more particularly to devices of this kind which are in the form of a protective covering or shield which can be brought into position to form a bullet-proof barrier for bank clerks or employees inside, such as the tellers or others who stand at the windows, thereby to protect them against attack by bandits or thieves from the outside.

Generally stated, therefore, the object of the invention is to provide a novel and effective structure which can be closed instantly, or brought into position, very easily, between the bank employee and the bandit or thief outside, which is preferably foot controlled for this purpose, so that the clerk or employee will be able to operate the protective structure in the desired manner after being told to put up his hands, practically without creating any suspicion of what he is doing, and whereby the protective device can be operated or controlled from various positions behind the counter or cage of the bank, thereby to provide a bullet-proof barrier between the employees inside and the bandits or thieves outside.

It is also an object to provide certain details and features of construction tending to increase the general efficiency and the desirability of a protective device of this particular character.

To the foregoing and other useful ends the invention consists in matters hereinafter set forth and claimed, and shown in the accompanying drawings, in which:—

Fig. 1 is a front elevation of a bank counter and cage provided with a foot-controlled protective device or shield embodying the principles of the invention.

Fig. 2 is a detail vertical section on line 2—2 in Fig. 1, on a larger scale, with certain portions broken away for convenience of illustration.

Fig. 3 is a detail horizontal section on line 3—3 in Fig. 1, on a larger scale.

Fig. 4 is a detail horizontal section on line 4—4 in Fig. 2.

Fig. 5 is a vertical section on line 5—5 in Fig. 2, showing the electrical controlling apparatus in diagram.

As thus illustrated, the bank counter 1 and the cage 2 may be of the ordinary or any suitable character. As shown, the invention comprises vertically disposed shutters 3 each mounted directly behind one of the vertical rods 4 of the cage, so that when the shutters are open they are directly opposite these rods. Said shutters have upper and lower pivots 5 and 6 mounted in suitable bearings so that the shutters turn about vertical axes, and when turned far enough will overlap each other as shown in dotted lines in Fig. 3, thus forming a bullet-proof shield or barrier between the bank teller inside of the cage and the bandit or thief outside. A horizontally disposed bar 7 is connected by springs 8 with the various shutters, so that endwise movement of this bar will move the shutters about their vertical axes, and with this arrangement one or more shutters can remain partially open without interfereing with the closing of the other shutters. The bar 7 is actuated by a heavy coil spring 9 applied thereto in any suitable manner, and this bar is held in normal position against the action of the spring by a tripping device 10 which engages the bent end portion 11 of said bar. When this tripping device is withdrawn, the tension of the spring 9 will throw the bar 7 to the left, causing the shutters to all close and overlap each other in the manner shown and described.

Any suitable arrangement can be employed for operating the tripping device 10, but as a matter of further and special improvement this is preferably done by an electro-magnet 12, the armature core 13 of which is connected by a bell crank 14 with the tripping device 10, so that when the magnet is energized the tripping device will be withdrawn and the bar 7 will be released. For the purpose of energizing the magnet a battery 15, or any source of current, can be employed, and the magnet and battery being connected in the circuit as shown, and a series of foot switches, or other switches 16, being connected in the circuit in the manner shown, whereby the closing of any switch will close the circuit through the magnet and cause the shutters to close. These switches 16 can be located beneath the counter, on the floor, if so desired, so that the bank employee can just quietly place his foot on the switch, even though he had been told to hold up his hands. The different switches, of any suitable number, can be located at different positions behind the counter, or in other parts of the bank. An electric gong 17 can be connected in the control circuit, so that an alarm will be sounded in the bank, or at some other place, when any switch is closed to operate the shutters.

When the shutters are open, the customers of the bank can see through the grating of the cage, in the usual manner, and the employees can look out through the grating in the ordinary manner. However, when the shutters are closed, in the manner explained, and caused to overlap each other, as shown in dotted lines in Fig. 3, the protective device then assumes the form of a steel barrier or shield between the bank employees inside and the bandits or thieves outside, and by making the shutters of strong steel or other metal, the barrier or shield thus afforded will be bullet proof and will afford ample protection for the bank employees.

It will be seen that the springs 8 constitute resilient arms connecting the shutters 3 with the endwise movable bar 7, so that these resilient arms 8 are under no tension, of course, when the shutters are open, and are under no tension while the bar is moving to close the shutters. Of course, when the shutters are entirely closed, if some pull is still exerted on the bar, these springs 8 may be subject to some tension, but they open and close the shutters merely as arms, and they do not necessarily flex except when some shutter is held open while the others are closed, for in such case the open shutter will have its spring placed under tension. In other words, the connecting arms 8 could be rigid and non-yielding, except for the fact that in closing the shutters something might be inserted through the shield at some point, and in such case it is desired to have the other shutters free to close while the one shutter is held open.

It will be seen that the coil spring 9 is arranged with its vertical axis in the plane of the axes of the shutters. Inasmuch as the springs 8 are also coil springs, where they engage the shutter pivots, it follows that the springs 8 and 9 have vertical axes disposed in the same vertical plane. Therefore, very obviously, when the bar 7 moves to the left to close the shutters, it also moves outwardly towards the axes of the shutters, but remains parallel with the plane in which said axes are located, whereby the shutters are closed uniformly. The shutters engage each other to limit their closing movement, and are held in this engagement with each other by the spring 9 through the medium of the springs 8, which latter are in effect fulcrumed on the pivots of the shutters.

What we claim as our invention is:—

1. In a protective structure of the class described, the combination of means to form a movable shield in front of the position occupied by the bank employee or other person, instrumentalities for controlling the motion of said shield, thereby to render the same operative in the event of an attack by bandits or thieves outside, said shield comprising a plurality of shutters pivoted to turn about parallel axes, spaced apart a distance to cause their edges to overlap when closed, so that each shutter limits the closing movement of the next one, and said instrumentalities comprising an endwise movable bar, springs for connecting said bar to the shutters, operative to both open and close the shutters by endwise motion of said bar, and operative to hold the shutters in open position, so that the springs prevent closing of the shutters when said bar is in one position thereof, and means to actuate said bar to quickly close the shutters, thereby to hold the shutters in engagement with each other to form the shield, whereby one or more shutters may by the yielding action of the spring or springs thereof remain open or partially open without preventing closing of the other shutters, said springs forming a yielding connection between the shutters and bar.

2. In a protective structure of the class described, the combination of means to form a movable shield in front of the position occupied by the bank employee or other person, instrumentalities for controlling the motion of said shield, thereby to render the same operative in the event of an attack by bandits or thieves outside, said shield comprising a plurality of pivoted shutters, spaced apart a distance to cause their edges to overlap when closed, so that each shutter limits the closing movement of the next one, and said instrumentalities comprising an endwise movable actuator connected by springs to the different shutters, whereby one or more shutters may by the yielding action of the spring or springs thereof remain open or partially open without preventing the closing of the other shutters, said springs being operative to hold the shutters open and forming a yielding connection between the shutters and actuator.

3. A structure as specified in claim 1, said springs being in effect fulcrumed upon the pivots of the shutters, and being coiled where they engage said pivots.

4. A structure as specified in claim 1, said means for actuating said bar being a coil spring with its axis disposed in the plane of the axes of the shutters, whereby said bar moves endwise and also towards said axes to close the shutters, but remains parallel with said plane.

5. A structure as specified in claim 1, said actuating means for said bar being adapted to maintain said bar substantially parallel with the plane of said axis of the shutter, to ensure uniform closing of the shutters.

Specification signed this 30th day of September, 1924.

LEWIS ALEXANDER.
WILLIAM H. H. HASTINGS.